June 19, 1956  E. DANILOW  2,750,672
LAYOUT GAUGE
Filed April 15, 1955
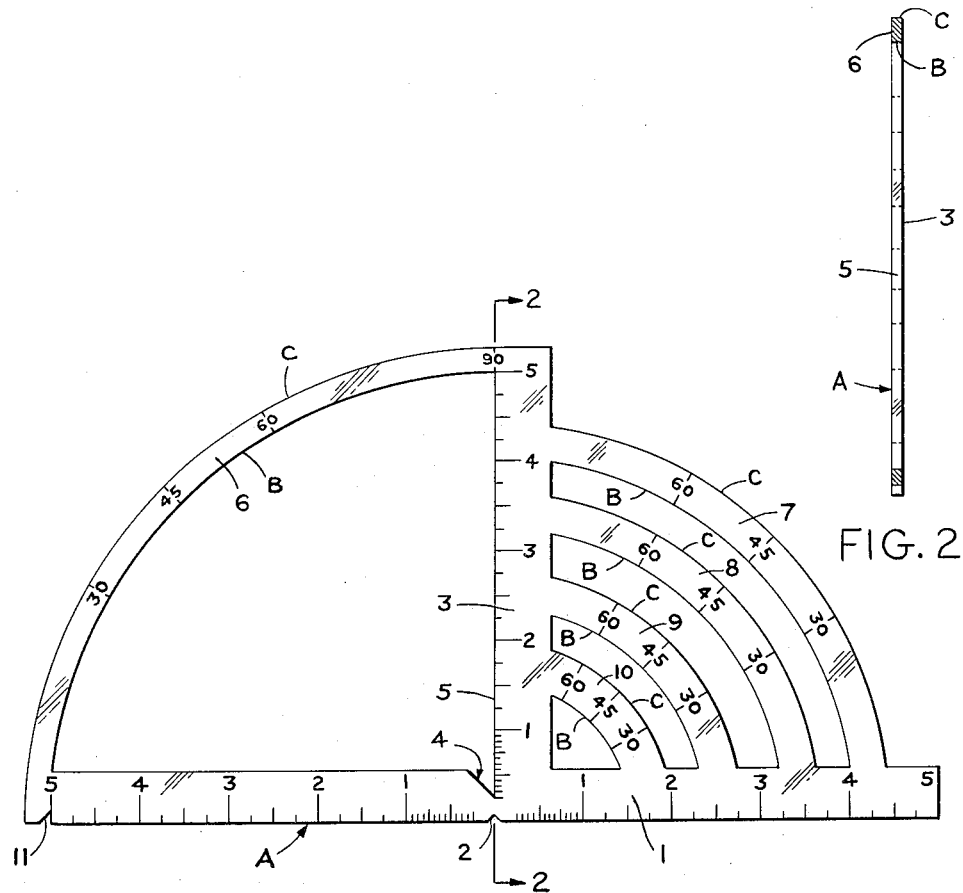
FIG. 2
FIG. 1
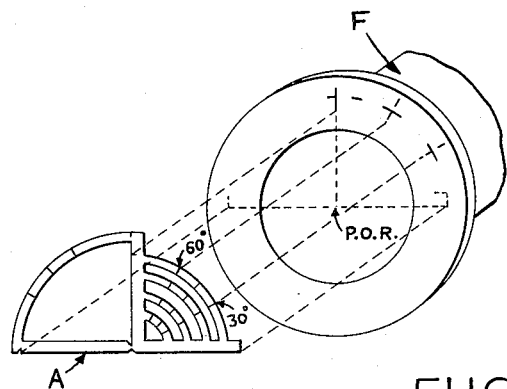
FIG. 3
EUGENE DANILOW
*INVENTOR.*
BY Daniel H. Bobis
atty United States Patent Office 2,750,672
Patented June 19, 1956

2,750,672
LAYOUT GAUGE
Eugene Danilow, North Arlington, N. J.
Application April 15, 1955, Serial No. 501,667
1 Claim. (Cl. 33—1)

This invention relates generally to a measuring instrument and more particularly to a layout gauge for determining the centers for bores in shafts or the centers for circumferentially spaced holes in a flange member.

In the manufacture of heavy machinery such as pumps, or the like, it is necessary to drill holes in shafts or as, for example, in the case of flanges, circumferentially spaced holes, which holes are parallel to the longitudinal axis of the member in which they are being bored or drilled.

Since the only points of reference from which a machinist can lay out such openings are the peripheral dimensions of the casting in which the openings are to be placed, it often becomes a difficult problem to find the centers for these holes or bores.

The present invention overcomes this problem by providing a straight edge having a member perpendicular thereto in the same plane which when laid on the casting being drilled establishes a point of reference by tringulation and arcuate elements connecting the elements perpendicular to each other with which it is possible to establish from this point of reference the desired centers for boring the spaced holes on a circle a predetermined distance from the point of reference. In addition, the present invention provides means for establishing centers for holes any given distance from the point of reference within the limits of the instrument itself.

Other objects of the invention will appear in the following detailed description taken in connection with the accompanying drawing, in which Figure 1 is a plan view showing the layout gauge.

Figure 2 is a sectional view taken on line 2—2 of Figure 1.

Figure 3 is an exploded perspective view of a flange and the layout gauge showing the markings on the flange.

Referring to the drawings, the layout gauge, generally designated A includes a straight edge 1 having an inverted V-shaped notch 2 cut therein to mark the center line of the layout gauge. A transverse member 3 is connected in the same plane as that of the straight edge 1, but in an axis perpendicular to the longitudinal axis of the straight edge and in a position such that one edge thereof falls along the predetermined center line indicated by the apex of the V-notch 2 cut in the straight edge 1.

Spaced outwardly on opposite sides of said inverted V-shaped notch 2 are distance graduations which in the present instance are in inches although it will be understood that they could be in centimeters without departing from the spirit of the present invention. Similar distance graduations are provided on the transverse member 3 which distance graduations are utilized as hereinafter described.

A notch 4 having one side parallel to the center line and continuous with the side 5 of the transverse member is disposed on the straight edge 1 on the side opposite from the inverted V-shaped notch 2. The apex of this notch 4 with respect to the notch 2 is an exact predetermined distance and provides means for finding centers for bores in shafts within the predetermined minimum distance that can be established with respect to the type material that the present layout gauge is constructed for during the fabrication thereof.

The present layout gauge may be made of plastic but is more preferably made of sheet steel such as 1/8" stock.

Figure 1 further shows a large arcuate member 6 disposed in the same plane as the straight edge 1 and the transverse member 3 and connected between the outermost edge of the transverse member 3 and one end of the straight edge 1. This large arcuate member is on a curve transversing 90 degrees of a circle having its radius on the center line passing through the inverted V-shaped notch 2.

On the side opposite from this large arcuate member 6 a plurality of smaller or lesser arcuate members 7, 8, 9 and 10 are disposed in spaced radial relation to each other in the same plane as the straight edge 1 and transverse member 3 but they are connected between points on these members inwardly of the ends thereof along a series of concentric circles each having their centers on the center line lying in the path of the inverted V-shaped mark 2.

Each of these lesser or smaller arcuate members 7, 8, 9 and 10 traverse an arc less than 90° on such circles which have the centers of their radii on such center line as above described. The reason that the arcs are less than 90° is due to the fact that the straight edge 1 and the transverse member 3 have a thickness and hence encompass a portion of the arc between zero and 30° and 60 to 90° on each of the smaller or lesser arcuate elements or members 7, 8, 9 and 10.

Operation

In operation, the machinist or layout man utilizing the print (not shown) related to the work which he is about to do determines what bores or holes will have to be drilled in the part on which he is working.

Thus, as shown in Figure 3, the instrument or layout gauge A is placed over the member F to be measured and using the peripheral dimensions of the member F, the gauge can be moved upwardly, downwardly and to the left or to the right until the distance dimensions on the straight edge 1 and transverse member 3 show that the inverted V-shaped notch 2 is equally spaced from all points on the periphery of the part in which the holes or bores will be drilled. In many parts such as flanges on pipes or pump castings, the center portion of the casting is hollow and hence the V-shaped notch in this instance merely operates as a point of reference designated P. O. R. relative to the member F. Where, however, the casting is a solid member, the V-shaped notch provides the center point and a mark can be made with a suitable instrument for drilling the bore therethrough.

The instrument, however, once centered is equally applicable for positioning the spaced holes on a circle a fixed distance from the point of reference. Thus, for example, it can be seen that each of the arcuate elements have their inner peripheries B and outer peripheries C disposed on certain of the major distance graduations as, for example, arcuate member 7 which has its inner periphery B at the spaced radius four inches from the point of reference established and its outer periphery C on the circle four and one-half inches from the point of reference. Therefore, once the instrument has been centered on the member in which the spaced circumferential holes are to be bored, the operator can make an arcuate line along either or both of the curves on the inner or outer peripheries at B and C of the arcuate elements 6, 7, 8, 9 and 10, and by the angular markings on each of the arcs position the centers by making a cross mark utilizing the angular dimensions on the same arcuate elements or the angular dimensions of one arcuate element with respect to the other at the same arcuate distance. Thus, for example, if the arc at four inches was taken and it was desired to find a center for holes at 30° and 60° on this arc the arcuate line would be drawn on the inner periphery B of member 7 and the cross marks would be taken on the side C of the arcuate member 7 or the side C of arcuate member 8 at the respective 60° and 30° points on these two respective arcs.

The reason that the major arc 6 is disposed on one side of the transverse member and the lesser arcs 7 to 10 are disposed on the opposite side of this member is by reason of the fact that they tend to lend strength to the instrument when constructed in this manner. Since these instruments are subject to rather rough handling in the environment in which they are being used, it was felt desirable to so construct these members both to make them functional and to add to the value of the instrument. It is believed clear that if the instrument were larger that additional members could be disposed on the side of the major arc as well as on the side of the lesser or smaller arcs without departing from the spirit of the present invention.

The outer notch 11 at the end of the straight edge which is connected to the major arcuate member 6 is provided to determine the fixed dimensions on the straight edge for purposes of accuracy in establishing the centers where the member is ten inches.

It will be understood that the invention is not to be limited to the specific construction or arrangement of parts shown, but that they may be widely modified within the invention defined by the claim.

What is claimed is:

A layout gauge for finding the centers for holes to be drilled in castings or the like comprising a straight edge having an inverted V-shaped notch on an edge thereof, a transverse member connected to said straight edge in the same plane and perpendicular thereto, said transverse member having one side falling in line with the V-shaped notch of said straight edge, a major arcuate member connecting the end of said transverse member to one end of said straight edge, and a plurality of arcuate members connected at intermediate points inwardly of the ends of said straight edge and said transverse member, a spaced radial distance from each other and on the side opposite from said major arcuate member, and said plurality of arcuate members each forming part of a circle having radii with the same center point lying on the edge of said straight edge.

References Cited in the file of this patent

UNITED STATES PATENTS

| | | |
|---|---|---|
| 727,680 | Otis | May 12, 1903 |
| 1,985,907 | Weems | Jan. 1, 1935 |
| 2,011,282 | Hochman | Aug. 13, 1935 |
| 2,453,261 | Peters | Nov. 9, 1948 |

FOREIGN PATENTS

| | | |
|---|---|---|
| 286,153 | Germany | July 24, 1915 |